United States Patent [19]
Griffith et al.

[11] Patent Number: 5,388,102
[45] Date of Patent: Feb. 7, 1995

[54] ARRANGEMENT FOR SYNCHRONIZING A PLURALITY OF BASE STATIONS

[75] Inventors: Gary L. Griffith, Arvada; Michael L. Nienaber, Thornton; Norman W. Petty, Boulder, all of Colo.

[73] Assignee: AT&T Corp., Murray Hill, N.J.

[21] Appl. No.: 86,678

[22] Filed: Jul. 1, 1993

[51] Int. Cl.⁶ ............................................. H04L 7/08
[52] U.S. Cl. ............................ 370/105.1; 370/110.1; 375/107; 455/51.1
[58] Field of Search ............ 370/18, 93, 95.1, 95.2, 370/95.3, 100.1, 102, 105.1, 110.1; 455/51.1, 51.2; 375/106, 107

[56] References Cited

U.S. PATENT DOCUMENTS

| | | | |
|---|---|---|---|
| 4,516,269 | 5/1985 | Krinock | 455/51.2 |
| 4,517,669 | 5/1985 | Freeburg et al. | 455/51.1 |
| 4,589,066 | 5/1986 | Lam et al. | 364/200 |
| 4,617,674 | 10/1986 | Mangulis et al. | 375/1 |
| 4,649,543 | 3/1987 | Levine | 455/51.1 |
| 4,665,404 | 5/1987 | Christy et al. | 342/463 |
| 4,672,658 | 6/1987 | Kavehrad et al. | 379/63 |
| 4,688,210 | 8/1987 | Eizenhöfer et al. | 370/18 |
| 4,696,052 | 9/1987 | Breeden | 455/51.2 |
| 4,718,109 | 1/1988 | Breeden et al. | 455/51.2 |
| 4,754,453 | 6/1988 | Eizenhöfer | 370/95.1 |
| 4,985,891 | 1/1991 | Fujiwara et al. | 370/110.1 |
| 5,117,424 | 5/1992 | Cohen et al. | 455/51.1 |
| 5,123,112 | 6/1992 | Choate | 455/56.1 |
| 5,177,766 | 1/1993 | Holland et al. | 375/1 |
| 5,184,347 | 2/1993 | Farwell et al. | 370/94.1 |
| 5,187,806 | 2/1993 | Johnson et al. | 455/15 |
| 5,189,670 | 2/1993 | Inglis | 370/100.1 |
| 5,228,038 | 6/1993 | Jestice et al. | 370/110.1 |

FOREIGN PATENT DOCUMENTS

| | | |
|---|---|---|
| 9100660 | 1/1991 | WIPO . |
| 9304545 | 3/1993 | WIPO . |
| 9312599 | 6/1993 | WIPO . |
| 9321739 | 10/1993 | WIPO . |

OTHER PUBLICATIONS

Stallings, W., *ISDN An Introduction*, Macmillan Publishing Company, New York, 1989, pp. 281–287.

Baxter, et al., *Communications and Control Architecture*, AT&T Technical Journal, vol. 64, No. 1, Jan. 1985, pp. 153–173.

*Wireless PBX*, Western Communications Forum, Anaheim, Calif., Feb. 2–5, 1992, Ericsson Business Communications Inc.

*Primary Examiner*—Benedict V. Safourek
*Attorney, Agent, or Firm*—David Volejnicek

[57] ABSTRACT

In a wireless telecommunications system (FIG. 1), over-the-air operations of a plurality of base stations (11) are synchronized via a synchronization signal that is embedded in the normal communications protocol that is used to convey traffic between a control switch (12) and the base stations. In the physical-layer protocol of the ISDN S or T basic-rate interface, the S or M bits are employed to conduct the synchronization signal. The synchronization signal is generated in the control switch and broadcast therein to port circuit packs (310) via a synchronization bit of a dedicated time-slot of a TDM bus (303).

23 Claims, 2 Drawing Sheets

ARRANGEMENT FOR SYNCHRONIZING A PLURALITY OF BASE STATIONS

TECHNICAL FIELD

The invention relates generally to wireless telecommunications systems, and specifically to cellular mobile telecommunications systems.

BACKGROUND OF THE INVENTION

In cellular systems, each geographical cell is served by a separate base station that provides wireless telecommunications services to station sets located within the cell. It is frequently desirable or necessary that the wireless, over-the-air, transmissions and receptions by the plurality of base stations be synchronized with each other. For example, in broadcast systems, synchronization of base stations' transmissions is necessary to prevent the transmissions from adjacent cells being garbled along cell boundaries. In frequency-hopping mobile systems, synchronization of the frequency-hopping by the base stations is necessary so that a station set crossing from one cell to another can be "handed over" by the base station of the exited cell to the base station of the entered cell and continue operating during the hand-over without interruption of communications. And in cellular systems, such as Code-Division Multiple-Access (CDMA) systems, that employ the "soft handoff" technique wherein a station set moving from one cell to another is, for a time, in communication with both cells' base stations, synchronization of the base stations is necessary to permit the simultaneous communication by the station set with a plurality of base stations.

The standard technique for synchronizing the operations of a plurality of base stations and keeping them synchronized is to supply the base stations with a synchronization signal. A number of techniques exist for supplying a synchronization signal to base stations, but all have attendant disadvantages. One technique uses an Earth-orbiting satellite to broadcast a synchronization signal to the base stations. However, this technique is rather complex, in that it requires both the presence of a satellite, and of a satellite signal receiver in each base station. Another technique uses wire or optical fiber links separate from the normal, customer traffic, communications links to connect the base stations to a central controller, over which links the central controller transmits the synchronization signal to the base stations. However, this technique requires the expense of a dedicated synchronization link leading to each base station. In yet another technique, a central controller periodically stops the normal communications on the normal communications links leading between the base stations and the central controller, then broadcasts a synchronization signal on the links, and then resumes the normal communications. While avoiding the expense of separate dedicated synchronization links, this technique causes periodic interruptions in normal communications.

What the art lacks is a simple and inexpensive technique for supplying base-station synchronization signals to a plurality of base stations.

SUMMARY OF THE INVENTION

This invention is directed to solving these and other shortcomings and disadvantages of the prior art. Illustratively according to the invention, over-the-air operations of a plurality of base stations in a wireless telecommunications system are synchronized via a synchronization signal that is embedded in the normal communications protocol that is used to convey traffic (customer communications) between a controller and the base stations. For example, in the physical layer protocol of the ISDN S or T basic-rate interface, the S or M bits are employed to conduct the synchronization signal.

Generally according to the invention, in a communications system comprising a plurality of base stations each having operations synchronized to a synchronization signal received from a controller that is connected to the base station by a plurality of links, the controller sends communications traffic to the base stations via the links by using a predetermined protocol to transport the traffic on the links, and further sends the synchronization signal simultaneously to all of the base stations via the links, to synchronize their operations, by using the predetermined protocol to transport the synchronization signal on the links along with the traffic. Preferably, the controller embeds the synchronization signal in the protocol, such as by causing otherwise-unused bits of the protocol to transport the synchronization signal on the links.

According to an aspect of the invention, a communications base station that has operations synchronized to a received synchronization signal comprises an arrangement that connects to at least one communications link in order to receive communications traffic transported on the link by a predetermined protocol, and an arrangement that extracts the synchronization signal from among the received communications traffic, which signal is transported on the link along with the traffic by the predetermined protocol.

According to another aspect of the invention, a controller for at least one communications base station having operations synchronized to a received synchronization signal comprises a first arrangement that connects to at least one communications link leading to the base station in order to send communications traffic to the base station via the link by using a predetermined protocol to transport the traffic on the link, and a second arrangement that sends the synchronization signal simultaneously to all bag stations via the at least one link to synchronize the operations of the at least one base station, by using the predetermined protocol to transport the synchronization signal on the at least one link along with the traffic.

Preferably, the controller further comprises a time-division multiplexed (TDM) bus having a repeating plurality of time slots including a predetermined time slot, and an arrangement connected to the TDM bus for periodically transmitting the synchronization signal on the TDM bus in the predetermined time slot. The first arrangement then comprises port circuit means connected to the TDM bus and interfacing the at least one link to the TDM bus for transmitting communications traffic carried by at least one time slot of the TDM bus on the at least one link by using the predetermined protocol, and the second arrangement comprises means connected to the TDM bus and responsive to receipt of the synchronization signal in the predetermined time slot for causing the port circuit means to transmit the synchronization signal on the at least one link embedded in the predetermined protocol.

Since the synchronization signal is carried from the controller on the same links as the traffic and by the same protocol as the traffic, no independent source of synchronization signals such as a satellite is required, no separate pathways for conducting the signal to the base stations are required, and no interruptions of traffic flow to make way for the synchronization signal are required. Furthermore, substantially conventional circuitry, that is required to originate the protocol at the controller and to terminate the protocol at the base stations, may by used to embed and extract the synchronization signal into and out of the protocol. All of this greatly reduces the complexity, cost, and interference with normal operations that result from conventional arrangements for conveying the synchronization signal to the base stations.

Moreover, the use at the controller of the TDM bus that is used to convey traffic to port circuits to also broadcast the synchronization signal to the port circuits simplifies the design of the controller and reduces to a minimum the changes that must be made to the controller to support this type of synchronization-signal distribution scheme.

According to a further aspect of the invention, in a controller for a plurality of communications base stations having operations synchronized to a received synchronization signal, which controller comprises a TDM bus having a repeating plurality of time slots including a predetermined time slot, the synchronization signal is periodically transmitted on the TDM bus in the predetermined time slot, a plurality of port circuits connected to the TDM bus transmit communications traffic carried by at least one time slot of the TDM bus on communications links that connect to the plurality of base station, and an arrangement connected to the TDM bus responds to receipt of the synchronization signal in the predetermined time slot by transmitting the received synchronization signal simultaneously to the plurality of base stations to synchronize the operations of the plurality of base stations. The basic configuration of a conventionally-architected controller may thus advantageously be used to provide for synchronization signal distribution, irrespective of how the synchronization signal is ultimately conveyed from the controller to the base stations.

These and other advantages and features of the invention will become more apparent from the following description of an illustrative embodiment of the invention taken together with the drawing.

DETAILED DESCRIPTION

Figure 1:
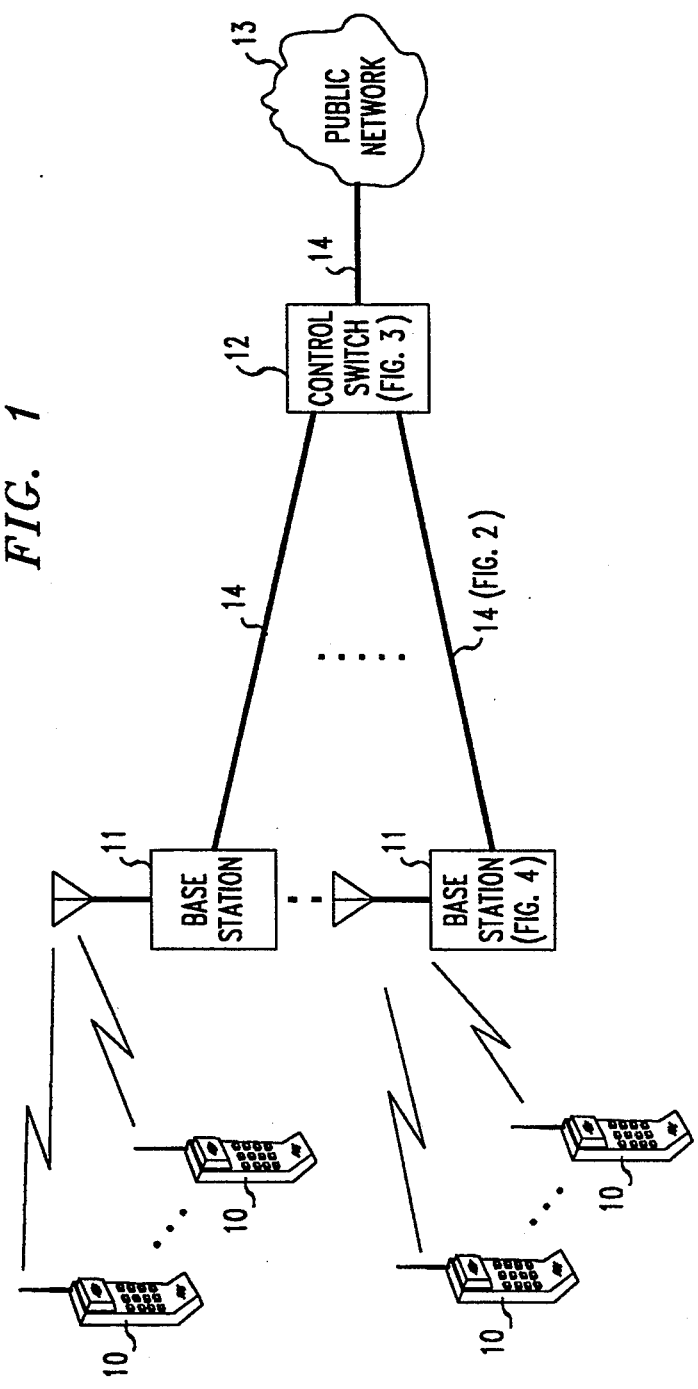
FIG. 1 is a block diagram of a wireless telecommunications system that incorporates an illustrative embodiment of the invention.

FIG. 1 shows in block diagram form a wireless telecommunications system. The system is configured in a conventional manner, and comprises a plurality of mobile (i.e., portable) user station sets 10, a plurality of base stations 11 that provide telecommunications services to station sets 10 located in their respective geographical service areas by communicating with those station sets 10 over the air, and a control switch 12 that provides an interface between base stations 11 and a public telecommunications network 13 and among the base stations 11 themselves, via wire or optical fiber telecommunications links 14, and that controls the operation of the wireless system of FIG. 1. Generally, each base station 11 is connected to control switch 12 by a plurality of links 14.

As described so far, the system of FIG. 1 is conventional. Illustratively, station sets 10 and base stations 11 are CDMA cellular radio-telephone system station sets and base stations. Control switch 12 is an AT&T Definity ® privatebranch exchange (PBX) or an AT&T 5ESS ® central office switch, and links 14 are ISDN basic-rate interface (BRI) links. Alteratively, station sets 10 and base stations 11 may be the AT&T Dragon wireless telephone handsets and bases adapted for mobile handoff operation.

One of the control functions of control switch 12, which is relevant to the invention described herein, is to keep the over-the-air operation of all base stations 11 synchronized with each other. According to the invention, control switch 12 accomplishes this function by broadcasting a synchronization signal to all base stations 11 via links 14. Each base station 11 then synchronizes its over-the-air operations (e.g. transmissions) with the received synchronization signal. It is assumed herein that the lengths and signal propagation characteristics of links 14 that interconnect base stations 11 and control switch 12 either are substantially identical, or that the effects of any differences in lengths and transmission characteristics cancel each other, so that each synchronization signal broadcast by control switch 12 roaches all base stations 11 substantially at the same time.

Further according to the invention, control switch 12 embeds the synchronization signal in the traffic (call information-carrying) communications protocol carried by links 14 so as to transport the synchronization signal to base stations 11 via that protocol along with the traffic. Hence, neither separate physical facilities (e.g., separate wires), nor a different protocol, nor interruptions in normal call traffic transmissions are required to convey the synchronization signals from control switch 12 to base stations 11.

Figure 2:
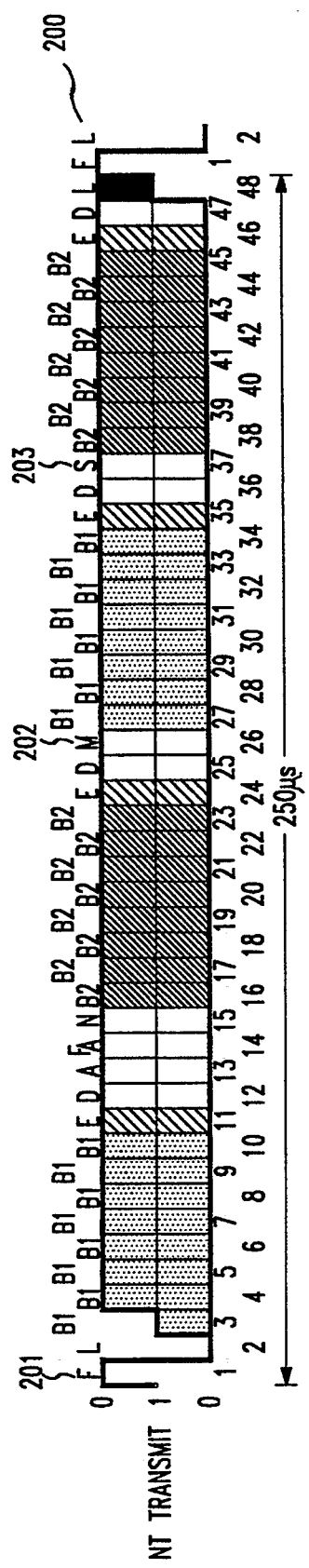
FIG. 2 is a diagram of a frame of the telecommunications protocol carried by links in the system of FIG. 1.

Using the ISDN protocol as an example, the embedding of the synchronization signal is illustrated in FIG. 2. This Figure shows the bit configuration of the information (including call traffic)-carrying frame 200 of the ISDN physical-layer network (NT)-to-terminal equipment (TIE) transmission protocol of the ISDN S or T basic-rate interface on a link 14. Frame 200 is transmitted on a link 14 at a 4 kHz repetition rate. As shown, frame 200 includes an M bit 202 and an S bit 203, which are the 26th and 37th bits, respectively, of frame 200. In the present definitions of the ISDN standard, S bits 203 of the third through fifth, eighth through tenth, thirteenth through fifteenth, and eighteenth through twentieth frames of a sequential 20-frame multiframe, are not used. Also, in many implementations of the ISDN standard, M-bit 202 (used in the standard definition to demarcate the multiframe) is not used. According to the invention, otherwise-unused S bits 203 or the M bits 202 are used to carry the base-station synchronization signals from control switch 12 to base stations 11. The following discussion describes how this may be accomplished.

Figure 3:
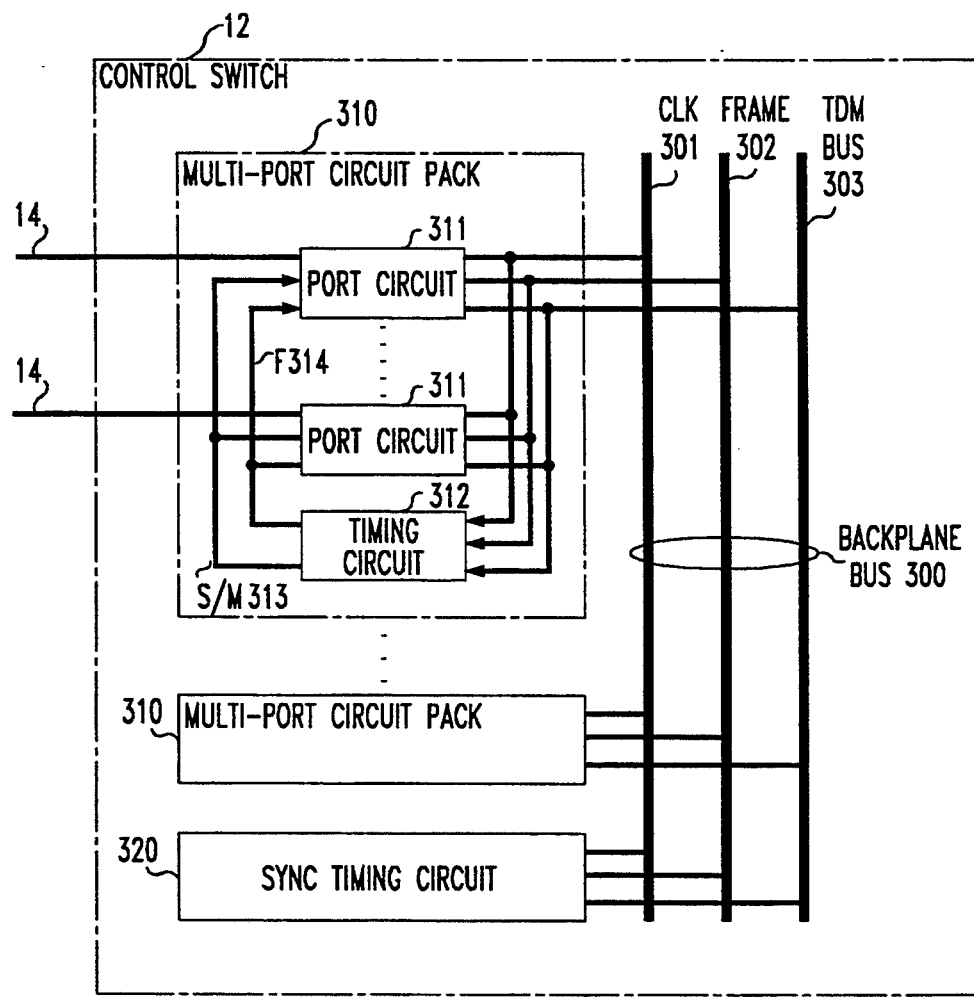
FIG. 3 is a block diagram of a portion of the control switch of the system of FIG. 1.

FIG. 3 shows in block diagram form those parts of the internal structure of control switch 12 that are relevant to an understanding of this invention. Control switch 12 includes a backplane bus 300 that includes a clock (CLK) lead 301, a FRAME lead 302, and a time-division multiplexed (TDM) bus 303. Illustratively, CLK lead 301 carries 2.048 MHz clock signals, FRAME lead 302 carries 8 kHz clock signals, and TDM bus 303 is a 512-time slot bus where each time slot carries 8 bits and has a repetition rate of 8 kHz. One of the time slots of each repeating plurality of 512 time slots on TDM bus 303 is dedicated to the distribution of basestation synchronization signals, and is referred to hereinafter as the synchronization time slot. Clock signals on CLK lead 301 are used to time individual bits on TDM bus 303.

Connected to a slot in backplane bus 300 is a synchronization timing circuit 320. Circuit 320 periodically generates the signal that is used to synchronize base stations 11 and transmits it in the synchronization time slot on TDM bus 303. Circuit 320 is of conventional design, such as a resettable counter. Circuit 320 counts frame signals on FRAME lead 302. When it has counted a predetermined number of frame signals, it sets a predetermined one of the eight bits of the next-occurring synchronization time slot on TDM bus 303. This predetermined bit of the synchronization time slot is referred to hereinafter as the synchronization bit. At all other times, this synchronization bit is cleared. Circuit 320 then resets its count and begins to count frame signals again.

How many frame signals circuit 320 must count before setting the synchronization bit depends on how often base stations 11 need to receive a synchronization signal. For example, if the system of FIG. 1 were a frequency-hopping system and if base stations 11 were to hop frequencies every 5 msecs., they preferably should receive a synchronization signal every 5 msecs., and circuit 320 must set the synchronization bit every 5 msecs. Hence, circuit 320 counts 40 of the 125 $\mu$sec. frame signals between successive settings of the synchronization bit.

If base stations 11 should need to receive a synchronization signal every 2.5 msecs., circuit 320 would count 20 of the 125 usec. frame signals between successive settings of the synchronization bit. 2.5 msecs. is also the timing between successive settings of M bit 202 when the M bits are used to demarcate 20-frame multiframes. In such an event, even those M bits that are being used to demarcate multiframes (as opposed to unused M bits) may be put to the use of conveying the synchronization signals to base station 11. However, provision must still be made for synchronizing such M bits being transmitted on different links 14.

Also connected to slots in backplane bus 300 are a plurality of multiport circuit packs 310. Each circuit pack 310 comprises a plurality of port circuits 311 and a timing circuit 312. Port circuits 311 interface links 14 to TDM bus 303 and transmit call traffic carded by time slots of TDM bus 303 on links 14. Port circuits 311 are conventional but for the fact that they accept external control signals from their circuit pack's timing circuit 312. Timing circuits 312 of all circuit packs 310 monitor the synchronization bit on TDM bus 303. When a circuit 312 detects that the synchronization bit is set, it generates a pulse signal on S/M lead 313 leading to port circuits 311 of its circuit pack 310 to cause port circuits 311 to transmit the synchronization signals to base stations 11. Port circuits 311 respond to receipt of the signal on S/M lead 313 each by setting whichever one of the next-occurring M bit 202 or the next-occurring predetermined one of the S bits 203 (see FIG. 2) that has been predesignated to carry the synchronization signal to base stations 11. A synchronization signal is thereby propagated simultaneously to all base stations 11.

Timing circuit 312 also monitors frame signals on FRAME lead 302. In this example, frame signals on lead 302 have a repetition rate of 8 kHz, while frames 200 on links 14 have a repetition rate of 4 kHz. So upon the occurrence of every other frame signal following receipt of the set synchronization bit, circuit 312 generates a pulse signal on F lead 314 leading to port circuits 311 of its circuit pack 310 to indicate the start of frame 200 period. Port circuits 311 align their start of transmission of each frame 200 (i.e., their transmissions of the framing (F) bit 201 of frames 200 —see FIG. 2) with the receipt of a signal on F lead 314. Thus it is ensured that all frame transmissions of all port circuits 311 of all circuit packs 310 are synchronized with the same frame signals on lead 302, and hence with each other.

Figure 4:
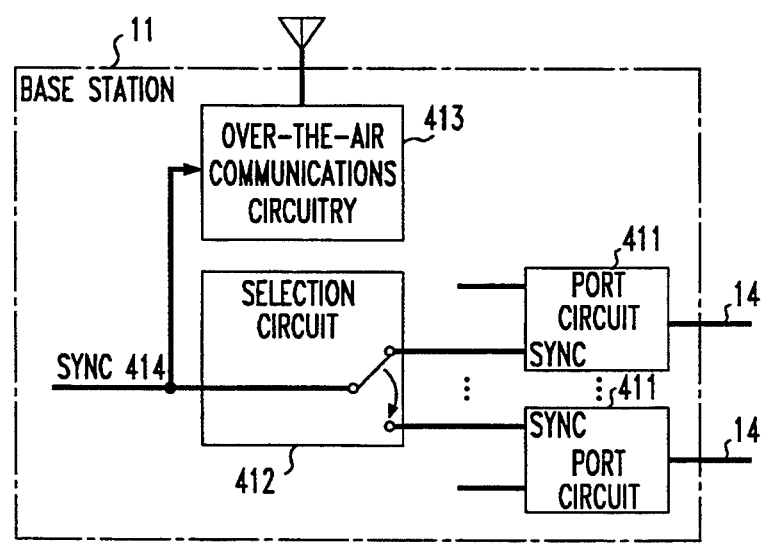
FIG. 4 is a block diagram of a portion of a base station of the system of FIG. 1.

As a consequence, all base stations 11 receive the synchronization signal substantially at the same time. As shown in FIG. 4, each link 14 terminates on a port circuit 411 at a base station 11. Port circuits 411 are conventional but for the fact that each has a synchronization (SYNC) signal output on which it transmits the synchronization signal that it extracts from among the traffic received on a link 14. Upon receipt of a frame 200 with the M or S bit that carries the synchronization signal being set, a port circuit 411 detects the set bit and responds thereto by generating a synchronization pulse signal at its SYNC output.

A base station 11 that has a plurality of port circuits 411, as shown in FIG. 4, receives a plurality of copies of the synchronization signal, one on each link 14, but needs only one. It therefore selects the SYNC output of only one of its port circuits 411 and discards the rest. Preferably, the selection is made through a selection circuit 412 that can select the SYNC output of any one of the plurality of port circuits 411. Should the selected port circuit 411 fail, selection circuit 412 responds thereto by selecting the SYNC output of one of the other port circuits 411. The selected circuit's SYNC output is connected by selection circuit 412 to a SYNC lead 414, which conducts the synchronization signal to other circuitry of base station 11 including over-the-air communications circuitry 413, for conventional use.

Of course, various changes and modifications to the illustrative embodiment described above will be apparent to those skilled in the art. For example, the above-described internal configuration of the control switch may be used to distribute the synchronization signal to circuits that transmit that signal to the base stations irrespective of what technique is actually used to convey the signal between the control switch and the base stations, with the advantage that the basic control switch configuration need not be changed to provide for synchronization signal distribution. Furthermore, in a system that includes a plurality of control switches, the scheme may be used to synchronize the operations of the control switches with each other. In such an arrangement, all but one of the plurality of control switches would be connected to the one (master) control switch in the same way as base stations, and the synch timing circuits in all but the master control switch would be replaced by port circuits which would transmit the received synch signal in the synchronization bit of the synchronization time slot of the TDM bus of their control switch. Such changes and modifications can be made without departing from the spirit and the scope of the invention and without diminishing its attendant advantages. It is therefore intended that such changes and modifications be covered by the following claims.

We claim:

1. A communications system comprising:
   a plurality of communications base stations each having operations synchronized to a received synchronization signal;
   a plurality of communications links connected to the plurality of base stations, at least one link being connected to each base station;
   a controller connected to the plurality of links for sending communications traffic to the base stations via the links, and using an ISDN protocol to transport the traffic on the links; and
   means in the controller for sending the synchronization signal simultaneously to all of the base stations via the links to synchronize the operations of the base stations, by embedding the synchronization signal in the ISDN protocol on the links including
   means for causing otherwise-unused bits of the ISDN protocol to transport the synchronization signal on the links.

2. The system of claim 1 wherein the ISDN protocol comprises an ISDN S or T basic-rate interface protocol having a physical layer, and
   the causing means comprise means for causing an S or an M bit of the physical layer of the protocol to transport the synchronization signal on the links.

3. A communications base station having operations synchronized to a received synchronization signal, comprising:
   means for connecting to at least one communications link to receive communications traffic transported on the link by an ISDN protocol; and
   means coupled to the connecting means for extracting the synchronization signal from among the received communications traffic, which synchronization signal is transported on the link along with the traffic by being embedded in the ISDN protocol, including
   means for extracting from otherwise-unused bits of the ISDN protocol the synchronization signal, which is transported by the otherwise-unused bits of the ISDN protocol on the link.

4. The base station of claim 3 wherein
   the ISDN protocol comprises an ISDN S or T basic-rate interface protocol having a physical layer, and
   the means for extracting from otherwise-unused bits comprise means for extracting from an s or an M bit of the physical layer of the protocol the synchronization signal, which is transported by the S or the M bit on the link.

5. The base station of claim 3 wherein
   the connecting means comprise a plurality of means, each for connecting to a different one of a plurality of communication links to receive communications traffic transported on the connected link by the ISDN protocol;
   the extracting means comprise a plurality of means each corresponding to a different one of the plurality of connecting means, for extracting from among the communications traffic received by the corresponding connecting means the synchronization signal, which is transported on the link that is connected to the corresponding connecting means by the ISDN protocol along with the traffic; and
   the base station further comprising means for selecting the synchronization signal extracted by one of the plurality of extracting means for synchronizing the operations of the base station.

6. A controller for at least one communications base station having operations synchronized to a received synchronization signal, comprising:
   means for connecting to at least one communications link that connects to the at least one base station, for sending communications traffic to the at least one base station via the at least one link, the connecting means using an ISDN protocol to transport the traffic on the at least one link; and
   means coupled to the connecting means, for sending the synchronization signal simultaneously to all base stations of the at least one base station via the at least one link to synchronize the operations of the at least one base station by embedding the synchronization signal in the ISDN protocol on the at least one link, including
   means for causing other, wise-unused bits of the ISDN protocol to transport the synchronization on the at least one link.

7. The controller of claim 6 wherein
   the ISDN protocol comprises an ISDN S or T basic-rate interface protocol having a physical layer, and
   the causing means comprise means for causing an S or an M bit of the physical layer of the protocol to transport the synchronization signal on the at least one link.

8. The controller of claim 6 further comprising:
   a time-division multiplexed (TDM) bus having a repeating plurality of time slots including a predetermined time slot, at least some of the time slots carrying communications traffic, and
   means connected to the TDM bus for periodically transmitting the synchronization signal on the TDM bus in the predetermined time slot;
   the connecting means comprise port circuit means connected to the TDM bus and interfacing the at least one link to the TDM bus for transmitting communications traffic carried by at least one time slot of the TDM bus on the at least one link by using the ISDN protocol; and
   the means for causing comprise means connected to the TDM bus and responsive to receipt of the synchronization signal in the predetermined time slot, for causing the port circuit means to transmit the synchronization signal in otherwise-unused bits of the ISDN protocol on the at least one link.

9. The controller of claim 8 wherein
   the ISDN protocol comprises an information-carrying, including communications traffic, carrying frame repeatedly outgoing from the port circuit means on the at least one link, and
   the causing means cause the port circuit means to transmit the synchronization signal on the at least one link in a next-outgoing frame.

10. The controller of claim 9 further comprising
    a signal lead connected to the port circuit means and carrying a repeating framing clock signal that has a repetition rate higher than a rate of repetition of the information-carrying frame on the at least one link; wherein
    the port circuit means comprise a plurality of port circuits connected to the TDM bus and each for interfacing a different link to the TDM bus for transmitting communications traffic carried by a time slot of the TDM bus on the interfaced link using the ISDN protocol, each one of the plurality of port circuits synchronizing its transmissions of sequential instances of the information-carrying frame with receipt of non-sequential instances of the franking clock signal on the signal lead, and means for causing all of the plurality of port circuits to synchronize their transmissions of the sequential instances of the information-carrying frame with receipt of same ones of the non-sequential instances of the framing clock signal on the signal lead, whereby transmissions by all of the port circuits of instances of the information-carrying frame are synchronized with each other so that all of the port circuits transmit the synchronization signal on the at least one link at a same time.

11. A controller for a plurality of communications base stations having operations synchronized to a received synchronization signal, comprising:

a time-division multiplexed (TDM) bus having a repeating plurality of time slots including a predetermined time slot, at least some of the time slots carrying communications traffic;

means connected to the TDM bus for periodically transmitting the synchronization signal on the TDM bus in the predetermined time slot;

a plurality of port circuit means connected to the TDM bus, each for interfacing to the TDM bus at least one communications link of a plurality of communication links that connect to the plurality of base stations, each port circuit means for transmitting communications traffic carried by at least one time slot of the TDM bus, in an information-carrying frame repeatedly outgoing on the at least one link;

means for distributing, to the plurality of port circuit means, a repeating framing clock signal that has a repetition rate higher than a rate of repetition of the information-carrying frame;

means for causing all of the plurality of port circuit means to synchronize their transmissions of sequential instances of the information-carrying frame with receipt of same ones of non-sequential instances of the framing clock signal; and means connected to the TDM bus and responsive to receipt of the synchronization signal in the predetermined time slot, for transmitting the received synchronization signal to the plurality of base stations from each port circuit means in a next-outgoing information-carrying frame to synchronize the operations of the plurality of base stations, whereby transmissions by all of the port circuit means of instances of the information-carrying frame that carry the synchronization signal are synchronized with each other so that all of the port circuit means transmit the synchronization signal to the plurality of base stations at a same time.

12. The controller of claim 11 wherein:

the port circuit means use a predetermined protocol to transport the communications traffic on the plurality of links; and the means for transmitting the received synchronization signal comprise means coupled to the plurality of port circuit means for causing the port circuit means to transmit the synchronization signal simultaneously to the plurality of base stations via the plurality of links by using the predetermined protocol to transport the synchronization signal on the plurality of links along with the traffic.

13. The controller of claim 12 wherein the distributing means comprise a signal lead connected to the plurality of port circuit means and carrying the repeating framing clock signal that has a repetition rate higher than the rate of repetition of the information-carrying frame;

the plurality of port circuit means comprise a plurality of port circuits connected to the TDM bus and each for interfacing a different link to the TDM bus for transmitting communications traffic carried by a time slot of the TDM bus on the interfaced link using the predetermined protocol, each one of the plurality of port circuits synchronizing its transmissions of sequential instances of the information-carrying frame with receipt of non-sequential instances of the framing clock signal on the signal lead; and the causing means comprise means for causing all of the plurality of port circuits to synchronize their transmissions of the sequential instances of the information-carrying frame with receipt of same ones of the non-sequential instances of the framing clock signal on the signal lead, whereby transmissions by all of the port circuits of instances of the information-carrying frame are synchronized with each other so that all of the port circuits transmit the synchronization signal on the plurality of links at the same time.

14. The controller of claim 11 wherein:

the plurality of port circuit means embed the synchronization signal in the predetermined protocol on the plurality of links.

15. The controller of claim 14 wherein:

the plurality of port circuit means cause otherwise-unused bits of the predetermined protocol to transport the synchronization signal on the plurality of links.

16. The controller of claim 16 wherein the predetermined protocol comprises an ISDN protocol.

17. The controller of claim 14 wherein the predetermined protocol comprises an ISDN S or T basic-rate interface protocol having a physical layer, and the plurality of port circuit means cause an S or an M bit of the physical layer of the protocol to transport the synchronization signal on the at least one link.

18. A method of transporting a synchronization signal to a plurality of communications base stations each having operations synchronized to said synchronization signal received from a controller connected to the base stations by a plurality of links, comprising the steps of:

sending communications traffic from the controller to the base stations via the links, by using an ISDN protocol to transport the traffic on the links; and sending the synchronization signal from the controller simultaneously to all of the base stations via the links to synchronize the operations of the base stations, by embedding the synchronization signal in the ISDN protocol on the links including causing otherwise-unused bits of the ISDN protocol to transport the synchronization signal on the links.

19. The method of claim 18 wherein
the ISDN protocol comprises an ISDN S or T basic-rate interface protocol having a physical layer, and
the step of causing comprises the step of
causing an S or an M bit of the physical layer of the protocol to transport the synchronization signal on the links.

20. A method of distributing a synchronization signal in a controller for a plurality of communications base stations having operations synchronized to the synchronization signal, comprising the steps of:
periodically transmitting the synchronization signal in a predetermined time slot of a time-division multiplexed (TDM) bus having a repeating plurality of time slots including the predetermined time slot;
transmitting communications traffic carried by at least one time slot of the TDM bus, from a plurality of port circuits connected to the TDM bus on communications links leading to the plurality of base stations, in an information-carrying frame repeatedly outgoing on each of the links;
distributing, to the plurality of port circuits, a repeating framing clock signal that has a repetition rate higher than a rate of repetition of the information-carrying frame;
synchronizing transmissions of sequential instances of the information-carrying frame from all of the ports circuits with receipt of same ones of non-sequential instances of the framing clock signal at each of the port circuits; and
in response to receipt of the synchronization signal in the predetermined time slot at an arrangement connected to the TDM bus, transmitting the received synchronization signal to the plurality of base stations from each port circuit means in a next-outgoing information-carrying frame to synchronize the operations of the plurality of base stations,
whereby transmissions from all of the port circuits of instances of the information-carrying frame that carry the synchronization signal are synchronized with each other so that all of the port circuits transmit the synchronization signal to the plurality of base stations at a same time.

21. A controller for at least one communications base station having operations synchronized to a received synchronization signal, comprising:
a time-division multiplexed (TDM) bus having a repeating plurality of time slots including a predetermined time slot, at least some of the time slots carrying communications traffic;
means connected to the TDM bus for periodically transmitting the synchronization signal on the TDM bus in the predetermined time slot;
port circuit means connected to the TDM bus, for interfacing to the TDM bus at least one communications link that connects to the at least one base station and for transmitting communications traffic carried by at least one time slot of the TDM bus on the at least one link to the at least one base station by using a predetermined protocol to transport the traffic on the at least one link; and
means connected to the TDM bus and responsive to receipt of the synchronization signal in the predetermined time slot, for causing the port circuit means to transmit the synchronization signal simultaneously to all of the base stations of the at least one base station to synchronize the operations of the at least one base station, the synchronization signal being embedded in the predetermined protocol on the at least one link.

22. The controller of claim 21 wherein
the predetermined protocol comprises an information-carrying, including communications traffic-carrying, frame repeatedly outgoing from the port circuit means on the at least one link, and
the causing means cause the port circuit means to transmit the synchronization signal on the at least one link in a next-outgoing frame.

23. The controller of claim 22 further comprising
a signal lead connected to the port circuit means and carrying a repeating framing clock signal that has a repetition rate higher than a rate of repetition of the information-carrying frame on the at least one link; wherein
the port circuit means comprise
a plurality of port circuits connected to the TDM bus and each for interfacing a different link to the TDM bus for transmitting communications traffic carried by a time slot of the TDM bus on the interfaced link using the predetermined protocol, each one of the plurality of port circuits synchronizing its transmissions of sequential instances of the information-carrying frame with receipt of non-sequential instances of the framing clock signal on the signal lead, and
means for causing all of the plurality of port circuits to synchronize their transmissions of the sequential instances of the information-carrying frame with receipt of same ones of the non-sequential instances of the framing clock signal on the signal lead,
whereby transmissions by all of the port circuits of instances of the information-carrying frame are synchronized with each other so that all of the port circuits transmit the synchronization signal on the at least one link at a same time.

* * * * *